United States Patent
Mack et al.

(10) Patent No.: US 7,048,327 B2
(45) Date of Patent: May 23, 2006

(54) COVER PANEL EDGE SEAL AND COVER PANEL FOR VEHICLE ROOF PROVIDED THEREWITH

(75) Inventors: Tom Mack, Highland, MI (US); J. Dean Krauss, Rochester Hills, MI (US); Kenny J. Minicuci, Macomb Township, MI (US); Daniel Harel, Portage, MI (US); Jean Guy Cocaign, Rochester, MI (US); Robert Tad Magruder, Rochester Hills, MI (US); Weilou Gao, Troy, MI (US)

(73) Assignee: Webasto Products North America, Rochester, MI (US)

( * ) Notice: Subject to any disclaimer, the term of this patent is extended or adjusted under 35 U.S.C. 154(b) by 0 days.

(21) Appl. No.: 10/939,402

(22) Filed: Sep. 14, 2004

(65) Prior Publication Data
US 2006/0055211 A1 Mar. 16, 2006

(51) Int. Cl.
*B60J 10/12* (2006.01)
(52) U.S. Cl. .................. 296/213; 296/216.09; 49/476.1
(58) Field of Classification Search ................. 296/213, 296/216.09; 49/476.1
See application file for complete search history.

(56) References Cited

U.S. PATENT DOCUMENTS

| 1,592,466 A | * | 7/1926 | Morgan ............... 49/476.1 |
| 5,466,508 A | * | 11/1995 | Brocke et al. ............ 428/122 |
| 6,334,646 B1 | * | 1/2002 | Oami ....................... 296/213 |
| 2003/0107244 A1 | | 6/2003 | Tamura et al. |

FOREIGN PATENT DOCUMENTS

| DE | 19832379 | * | 1/2000 |
| JP | 5-185839 | * | 7/1993 |
| JP | P2001-213175 A | * | 8/2001 |

\* cited by examiner

*Primary Examiner*—Dennis H. Pedder
(74) *Attorney, Agent, or Firm*—David S. Safran

(57) ABSTRACT

A cover panel for closing a roof opening has a panel body, a support frame for the panel body, and a seal member having a substantially rigid mounting portion mounted on an edge of the support frame and extending around an outer circumferential edge of the panel body, and a resilient hollow seal portion for engaging the outer circumferential edge of the panel body. An arrangement is provided by which water passing between the seal portion and the circumferential edge can pass be drained away. Furthermore, a glass support portion of the seal member is bifurcated, having a flexibly hinged upwardly angled flange portion that is deformed downward upon placement of the glass pane to insure correct Z-axis (vertical) positioning of the glass pane forming the panel body and to prevent adhesive from flowing between the panel body and the seal member.

24 Claims, 2 Drawing Sheets

COVER PANEL EDGE SEAL AND COVER PANEL FOR VEHICLE ROOF PROVIDED THEREWITH

BACKGROUND OF THE INVENTION

1. Field of the Invention

The present invention relates to a edge seals for cover panels for motor vehicle sunroofs and a cover panel with such a seal mounted around a circumferential edge of the panel for use in sealing the periphery of the cover panel relative to the edge of the fixed roof structure defining an opening in a vehicle body within which the cover panel is received.

2. Description of Related Art

Sunroofs in vehicles are well known and typically include a movable panel that is received in an opening that is formed in the fixed roof structure of the vehicle body. The movable panel typically is formed of a pane of glass or a steel plate that is slidable in the longitudinal direction of the vehicle to open or close the opening and/or may be raisable at a rear edge. This cover panel of such a sunroof also has an edge seal member for preventing rainwater from entering into the vehicle by the seal member being in contact with an inner circumferential edge of the edge of the fixed roof structure defining the roof opening. To suppress wind noise in the closed position, it is desirable to use a so-called flush surface structure in which the upper surface of the seal member, the upper surface of the movable cover panel, and the upper surface of the fixed roof structure of the vehicle body are flush and continuous with one another.

Published U.S. Patent Application 2003/0107244 discloses the panel seal structure 3 shown in FIG. 1 of this application having an edge seal member 12 mounted around the outer circumferential edge of a glass pane forming the panel body 5 of a cover panel for covering an opening formed in a vehicle body. The panel body 5 is supported by glass holder 4 that a rising edge 17 formed on its outer circumferential edge. The seal member has connecting portion 19 has a groove 18 for mounting of the seal member on the edge 17 of the glass holder 4.

The edge seal member 12 has an upper face set to be substantially flush with an upper face of the panel body 5, and a lip 20 for contacting an edge of the panel body 5 is formed extending horizontally from the upper face of the seal. The free edge portion of the lip 20 is deformed downward upon contact with the edge of the panel body 5. With this panel seal structure, downward deformation of the edge of the lip 20 serves to absorb any dimensional error of the panel body, and enhances the continuity between the upper face of the seal structure 3 and the upper face of the panel body 5.

The edge seal member 12 also has a contact portion 13 that is made of a soft material configured in a hollow shape so as to be relatively easily collapsible and which, in use, seals against the inner circumferential edge of the edge of the fixed roof structure defining the roof opening in the closed position of the cover panel. Additionally, the edge seal member 12 has a glass panel connecting portion 14 that is made of a hard/rigid material and is formed with a shelf portion 15 and a camber absorption lip 16. The shelf portion 15 makes contact with a lower face of the glass panel 5, and the camber absorption lip 16 is intended to follow the curvature of the glass holder 4 by resiliently contacting its upper face. The glass panel body 5 is fixed on the glass holder 4 by an adhesive that fills the gap G (shown in FIG. 1) between the glass pane and the glass holder 4.

However, in practice, it has been found that this prior art roof suffers from two significant deficiencies. Firstly, the lip 20 has a tendency to allow water to leak past it. Water that leaks past the lip 20 is able to flow along the channel created by the space between the lip 20 and the connecting portion 14, and ultimately can find its way into the vehicle interior.

Secondly, when affixing the glass panel body 5 onto the glass holder 4, frequently the adhesive is able to get between shelf portion 15 of the seal member 12 and the underside of the glass panel body 5. This results in the glass panel body 5 becoming offset so as to both affect the appearance of the roof and lead to increase wind noise.

SUMMARY OF THE INVENTION

In view of the foregoing, it is an object of the present invention to improve upon the known edge seals for cover panels for motor vehicle sunroofs and cover panels with such seals so that water is not able to leak between the edge seal and glass, and then work its way into the vehicle interior.

It is a further object to improve upon the known edge seals for cover panels for motor vehicle sunroofs and cover panels with such seals so that the adhesive used to secure the glass cover pane to its support frame will be prevented from getting between the seal member and the glass.

In accordance with a first feature of the present invention, instead of providing a lip on the seal member for engaging the edge of the glass pane, a hollow chamber seal, analogous to that used to seal against the peripheral edge of the roof opening is used. Furthermore, one or more holes are provided through the glass support portion of the seal so that any leakage can pass down into the cover support frame. Since lateral ends of the cover support frame overly the roof opening frame in the closed position of the cover, and since it is known to provide drain tubes for removing water from the roof opening frame and passing it to the exterior of the vehicle, any water which may leak past the seal member will be prevented from entering the vehicle interior.

According to a second aspect of the invention, the glass support portion is bifurcated, being provided with a flexibly hinged upwardly angled flange portion that is deformed downward upon placement of the glass pane. This flange serves to insure correct Z-axis (vertical) positioning of the glass pane forming the panel body and at the same time serves to prevent adhesive from flowing between the panel body and the seal member. Additionally, the lower leg of the bifurcation can be provided with teeth on its upper face for providing a secure interlock between the seal and the adhesive.

These and other objects, features and advantages of the present invention will become apparent from the following detailed description when viewed in conjunction with the accompanying drawings.

DETAILED DESCRIPTION OF THE INVENTION

Figure 1:
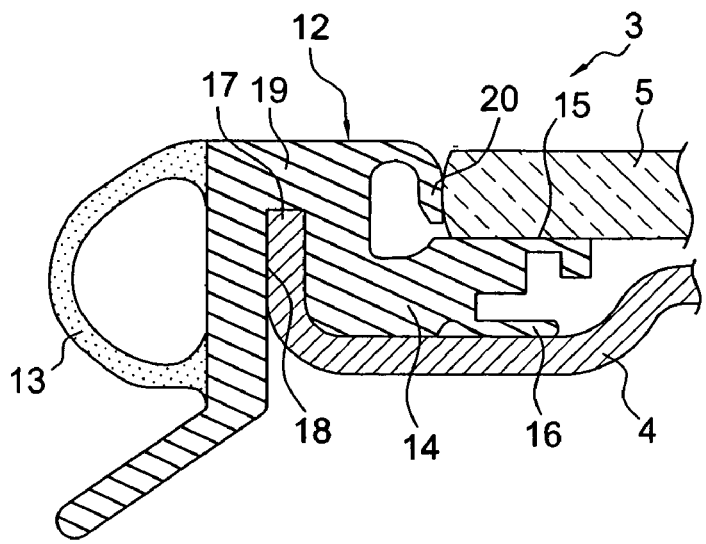
FIG. 1 is an enlarged cross-sectional view of the edge are of cover panel having an edge seal member according to the prior art.

In the following description, to facilitate comparison with the prior arrangement of U.S. Patent Application 2003/0107244 shown in FIG. 1, corresponding parts of the present invention bear the same reference number increased by 100 (e.g., the edge seal member 112 of the present invention corresponds to the edge seal member 12 of the prior arrangement). Thus, the following description will focus primarily on those aspects of the present invention which differ from FIG. 1 seal member.

The seal member 112 of the present invention has a substantially rigid mounting portion 114 with a recess 118 for mounting on an edge 117 of a support frame 104 of a cover panel for, e.g., a vehicle sunroof. The seal member 112 also has a resilient seal element 150 that is affixed to the mounting portion 114 and engaging the outer circumferential edge of the panel body. The seal element 150, in accordance with the illustrated embodiment is a one-piece element comprised of a resilient seal portion 152 which serves the function of the lip 12 of the above cited prior arrangement and an edge seal 113. Both the seal element portion 152 and the edge seal 113 are in the form of hollow chamber seals made of a softer/more resilient material that the relatively hard/stiff material of the mounting portion 114. Preferably, the seal element is molded onto the mounting portion during molding of the mounting portion 114. While the seal element portion 152 and the edge seal 113 are shown as parts of the same seal element 150, they can be separate elements that are attached separately in any manner known for mounting of such seals in the sunroof art.

Figure 3:
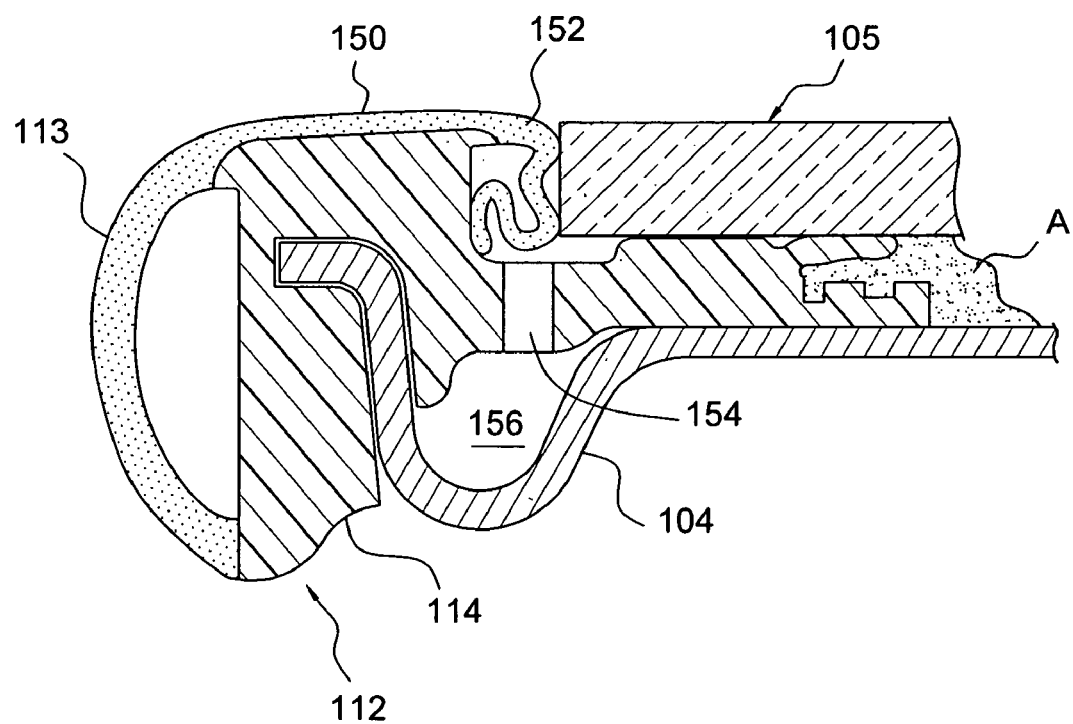
FIG. 3 is an enlarged cross-sectional view of the edge area of cover panel of the present invention having the edge seal member of FIG. 2 installed therein.

The mounting portion 114 has at least one through-hole 154 that extends from an area underlying said hollow seal portion 152 to an area communicating with a channel recess 156 formed in said support frame. When the panel body 105, which is preferably a glass pane, is mounted on the mounting portion 114, its circumferential edge partially collapses the hollow seal portion 152 as shown in FIG. 3. This insures that the through-hole(s) 154 is not blocked by the seal portion 152 and enables any water passing between said seal portion 152 and the circumferential edge of the panel body 105 to pass through the through-hole(s) to the channel recess 156 for drainage out to the vehicle exterior as noted in the Summary above.

Figure 2:
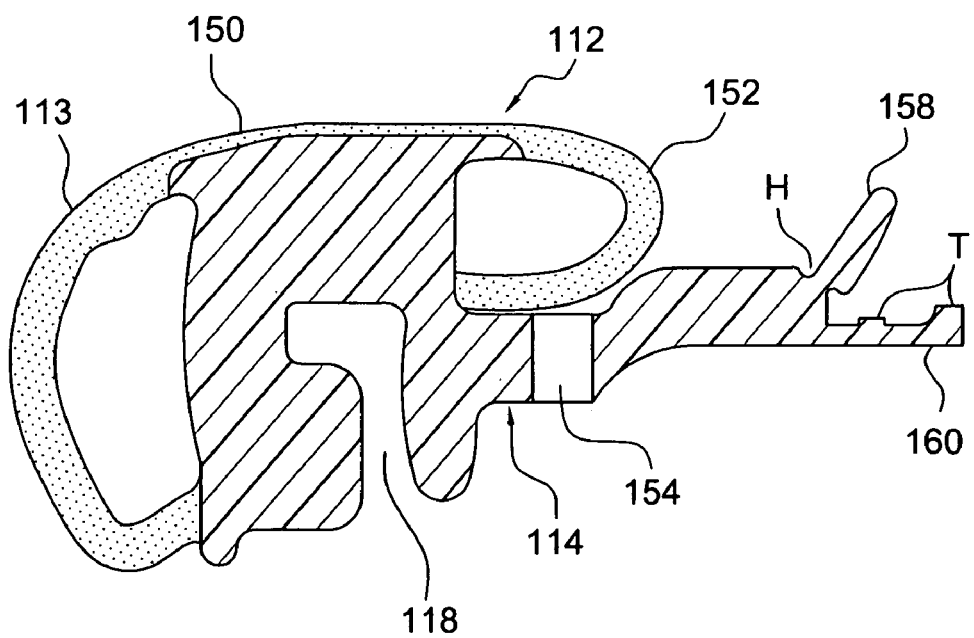
FIG. 2 is an enlarged cross-sectional view showing an edge seal in accordance with the present invention.

Additionally, the glass support portion of the seal member is bifurcated, having a flexibly hinged upwardly angled flange part 158 that has been resiliently deformed downward by the panel body 105 when it is placed on it (compare FIGS. 2 & 3), the hinging being formed by a reduction of the thickness of the material of the support portion 114 in area H to an extent sufficient to enable it flex. This flange part 158 insures proper Z-axis positioning of the panel body and preventing adhesive from flowing between the panel body and the seal member. The lower leg 160 of the bifurcated part of the support portion has teeth T which serve to anchor the seal member 112 in the adhesive A used to secure the panel body 105 to the support frame 104.

The present invention is not intended to be limited to the specific features of the embodiment described above, it being contemplated that numerous modifications may be made to the present invention without departing from the spirit and scope of the invention as defined in the claims. For example, while the sealing structure is described for use in a sunroof of a motor vehicle, it may be employed in other types of vehicles, such as campers, and in other applications such as for buildings and other structures that have openings comparable closures which are required to be sealed.

What is claimed is:

1. A cover panel for closing a roof opening, comprising:
    a panel body;
    a support frame for the panel body; and
    a seal member having a substantially rigid mounting portion mounted on an edge of the support frame and extending around an outer circumferential edge of the panel body, and a resilient seal portion affixed to said mounting portion and engaging the outer circumferential edge of the panel body
    wherein said mounting portion has at least one through-hole that extends from an area underlying said resilient seal portion to an area communicating with a channel recess formed in said support frame, whereby water passing between said seal portion and said circumferential edge can pass through said at least one through-hole to said channel recess.

2. The cover panel according to claim 1, wherein the panel body is a glass pane.

3. The cover panel according to claim 1, wherein the cover panel is a vehicle sunroof closure panel for closing an opening in fixed roof surface of a vehicle body.

4. The cover panel according to claim 1, wherein the resilient seal portion comprises a hollow chamber seal.

5. The cover panel according to claim 1, wherein the panel body is attached to the glass support portion by an adhesive.

6. The cover panel according to claim 1, wherein the rigid mounting portion of the seal member is bifurcated, having a flexibly hinged upwardly angled flange portion that has been resiliently deformed downward by the panel body, said flange setting Z-axis positioning of the panel body and preventing adhesive from flowing between the panel body and the seal member.

7. The cover panel according to claim 6, wherein the cover panel is a vehicle sunroof closure panel of a vehicle sunroof for closing an opening in fixed roof surface of a vehicle body.

8. A cover panel for closing a roof opening, comprising:
    a panel body;
    a support frame to which the panel body is attached by an adhesive; and
    a seal member having a substantially rigid mounting portion mounted on an edge of the support frame and extending around an outer circumferential edge of the panel body, and a resilient seal portion affixed to said mounting portion and engaging the outer circumferential edge of the panel body;
    wherein the rigid mounting portion of the seal member has a bifurcated part having a lower leg engaging said support frame and a flexibly hinged flange portion that has an undeformed shape that is angled in a direction upward and away from said seal portion and that has been resiliently deformed downward by the underside of the panel body, said flange setting Z-axis positioning of the panel body and preventing adhesive from flowing between the panel body and the seal member.

9. The cover panel according to claim 8, wherein the panel body is a glass pane.

10. The cover panel according to claim 8, wherein the cover panel is a vehicle sunroof closure panel for closing an opening in fixed roof surface of a vehicle body.

11. The cover panel according to claim 8, wherein the resilient seal portion comprises a hollow chamber seal.

12. A cover panel for closing a roof opening, comprising:
a panel body;
a support frame to which the panel body is attached by an adhesive; and
a seal member having a substantially rigid mounting portion mounted on an edge of the support frame and extending around an outer circumferential edge of the panel body, and a resilient seal portion affixed to said mounting portion and engaging the outer circumferential edge of the panel body;
wherein the mounting portion of the seal member has a bifurcated part, having a flexibly hinged upwardly angled flange portion that has been resiliently deformed downward by the panel body, said flange setting Z-axis positioned on the panel body and preventing adhesive from flowing between the panel body and the seal member;
wherein the bifurcated part of the mounting portion has a lower leg, a lower side of which is flat for resting on the support frame in the installed state of the seal member and an upper side of which has anchoring teeth for anchoring in adhesive used to attach the support frame to the panel body in said installed state.

13. A seal member for a cover panel for closing a roof opening, comprising:
a substantially rigid mounting portion configured for mounting on an edge of a support frame and for extending around an outer circumferential edge of a panel body of a cover panel in an installed state thereof, and
a resilient seal portion affixed to said mounting portion for engaging an outer circumferential edge of the panel body when the mounting portion is positioned on the support frame in said installed state;
wherein said mounting portion has at least one through-hole that extends from an area underlying said resilient seal portion for communicating with a channel recess formed in the support frame in said installed state for enabling water passing between said seal portion and said circumferential edge to pass through said at least one through-hole to said channel recess.

14. The seal member according to claim 13, wherein the resilient seal portion comprises a hollow chamber seal.

15. The seal member according to claim 14, further comprising a cover edge seal mounted to said mounting portion facing in an opposite direction from said hollow chamber seal.

16. The seal member according to claim 15, wherein said cover edge seal is a second hollow chamber.

17. The seal member according to claim 13, wherein the rigid mounting portion of the seal member is bifurcated, having a flexibly hinged upwardly angled flange portion that is downward deformable upon placement of the pane body thereon for Z-axis (vertical) positioning of the panel body and to prevent adhesive from flowing between the panel body and the seal member upon affixing of the panel body to the mounting portion.

18. A seal member for a cover panel for closing a roof opening, comprising:
a substantially rigid mounting portion configured for mounting on an edge of a support frame and for extending around an outer circumferential edge of a panel body of a cover panel in an installed state thereof, and
a resilient seal portion affixed to said mounting portion for engaging an outer circumferential edge of the panel body when the mounting portion of positioned on the support frame in said installed state;
the rigid mounting portion of the seal member has a bifurcated partt having a lower leg for engaging the support frame and a flexibly hinged flange portion that has an undeformed shape that is angled in a direction upward and away from said seal portion and that is downwardly deformable upon placement of the pane body thereon for Z-axis positioning of the panel body and to prevent adhesive from flowing between the panel body and the seal member upon affixing of the panel body to the mounting portion.

19. The seal member The seal member according to claim 18, wherein the resilient seal portion comprises a hollow chamber seal.

20. The seal member according to claim 19, further comprising a cover edge seal mounted to said mounting portion facing in an opposite direction from said hollow chamber seal.

21. The seal member according to claim 20, wherein said cover edge seal is a second hollow chamber.

22. A seal member for a cover panel for closing a roof opening, comprising:
a substantially rigid mounting portion configured for mounting on an edge of a support frame and for extending around an outer circumferential edge of a panel body of a cover panel in an installed state thereof; and
a resilient seal portion affixed to said mounting portion for engaging an outer circumferential edge of the panel body when the mounting portion is positioned on the support frame in said installed state;
the mounting portion of the seal member has a bifurcated part, having a flexibly hinged upwardly angled flange portion that is downward deformable upon placement of the pane body thereon for Z-axis positioning of the panel body and to prevent adhesive from flowing between the panel body and the seal member upon affixing of the panel body to the mounting portion;
wherein the bifurcated part of the mounting portion has a lower leg, a lower side of which is flat for resting on the support frame in the installed state of the seal member and an upper side of which has anchoring teeth for anchoring in adhesive used to attach the support frame to the panel body in said installed state.

23. The seal member according to claim 8, wherein the resilient seal portion affixed to said mounting portion and engaging the outer circumferential edge of the panel body is a hollow chamber seal.

24. The seal member according to claim 18, wherein the resilient seal portion affixed to said mounting portion and engaging the outer circumferential edge of the panel body is a hollow chamber seal.

* * * * *